May 22, 1962 L. E. LEON 3,035,660
KNOCK-DOWN SUPPORT STAND
Filed May 15, 1961
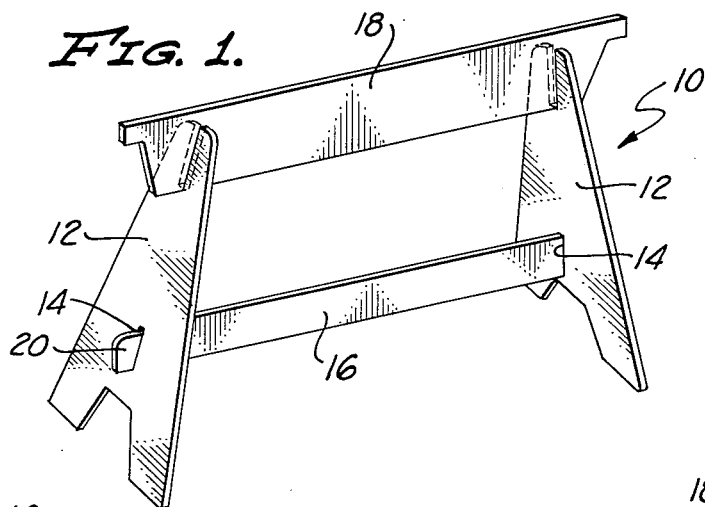
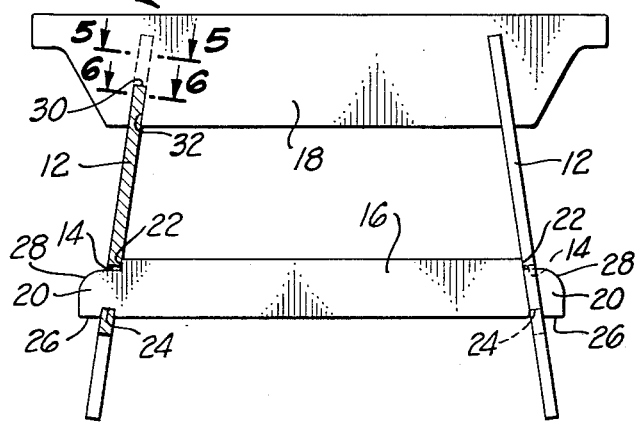
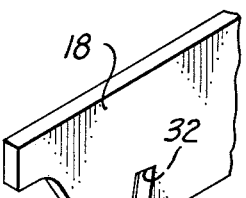
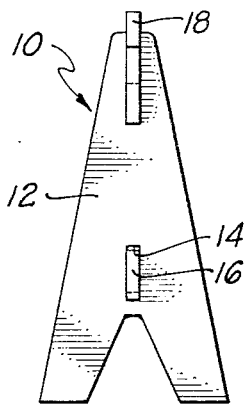
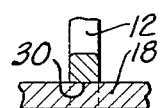
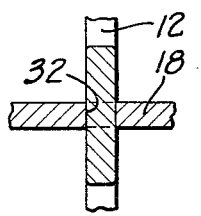
INVENTOR.
LOUIS E. LEON
BY Thomas P. Mahoney
ATTORNEY 3,035,660
KNOCK-DOWN SUPPORT STAND
Louis E. Leon, 14913 Purche Ave., Gardena, Calif.
Filed May 15, 1961, Ser. No. 109,922
1 Claim. (Cl. 182—181)

This invention relates to a support stand, and more particularly, to a knock-down support stand which is capable of being knocked down or taken apart for transportation or storage in compact form.

Support stands used by carpenters for saw-horses, stands used by painters for supporting a working platform, stands used for supporting temporary work tables, and similar structures are usually bulky and irregular in form so that a considerable space is needed for their transportation or storage.

It is, therefore, an object of the present invention to provide a knock-down support stand which is sufficiently strong to withstand heavy loads, and yet which is adapted to be easily and quickly knocked down or taken apart for transportation or storage in compact form.

Another object of the invention is the provision of a knock-down support stand of the character described which does not require any fasteners for securing together the components in operative relationship.

A further object of the invention is to provide a knock-down support stand which includes a pair of spaced legs having openings therein for receiving an elongated spreader bar, the relative sizes of the openings compared to the extremities of the spreader bar being such that the bar is wedged within the openings when the legs are tilted, the tilted positions of the legs being maintained by a brace extending between and connected to the legs. With this arrangement, the support stand is quickly assembled by inserting the extremities of the spreader bar into the openings of the legs, tilting the legs, and then removably connecting the brace to the legs to maintain the legs in their tilted positions.

Another object of the invention is to provide a knock-down support stand which may be made of wood, and which is held together solely by the engagement of the margins of slots and openings cut into the components of the stand with mating portions of the other components of the stand.

A further object of the invention is to provide a knock-down support stand which by reason of its design may be relatively inexpensively mass-produced.

Other objects and advantages of the invention will be apparent from the following specification and the accompanying drawing, which is for the purpose of illustration only, and in which:

FIG. 1 is a perspective view of a knock-down support stand of the present invention;

FIG. 2 is a front elevational view, partially in cross section, of the support stand of FIG. 1;

FIG. 3 is an end elevational view of the support stand;

FIG. 4 is a detailed perspective view, particularly illustrating the arrangement of the interfitting slots in the brace and the legs;

FIG. 5 is a detailed cross-sectional view, on an enlarged scale, taken along the broken line 5—5 of FIG. 2; and FIG. 6 is a detailed, cross-sectional view on an enlarged scale, taken along the broken line 6—6 of FIG 2.

Referring to the drawing, I show a knock-down support stand generally indicated at 10, and preferably made of wood, and constituted by a pair of spaced apart legs 12, each of which includes a vertically extending slot 14 therethrough; an elongated spreader bar 16 horizontally arranged between the legs 12; and a demountable brace 18 which constitutes a support, horizontally arranged between and connected to the upper extremities of the legs 12.

The extremities 20 of the spreader bar 16 are reduced, that is, the depth or vertical dimension of the extremities 20 is less than the depth or vertical dimension of the intermediate portion of the spreader bar 16, providing a pair of shoulders 22 adjacent the upper edge of the spreader bar 16. In addition, a pair of recesses or indents 24 is provided in the lower edge of the extremities 20 of the spreader bar 16, the indents 24 being located beneath and slightly outwardly of the shoulders 22. The recesses 24 are also angularly and inwardly oriented with respect to a line normal to said lower edge.

The extremities 20 of the spreader bar 16 are removably receivable within the openings or vertical slots 14 in the legs 12, although, as will be seen, the spreader bar 16 is normally constrained against removal from the slots 14.

The height or vertical dimension of the outer ends of the extremities 20 is preferably made greater than the vertical height of the slots 14 so that the spreader bar 16 cannot be inserted within the slots 14 when the bar 16 is arranged perpendicularly to the legs 12. Instead, the legs 12 must be hooked about the ends of the extremities 20, and thereafter rotated to their normal, generally upright positions. For this purpose, the distance between the outer margin of each of the indents 24 and the outer end of the extremity 20 is less than the vertical height of the associated slot 14, and the outer upper corner of the extremity 20 is arcuately formed or rounded, as at 28, so that the spreader bar 16 may be inserted into the openings or slots 14.

This is accomplished as follows: first, a leg 12 and one extremity 20 of the spreader bar are relatively arranged so that the portion 26 of the extremity 20 is in registry with and is received within the slot 14; next, the leg 12 and bar 16 are relatively pivoted until the rounded portion 28 clears the upper margin of the slot 14 and the leg 12 seats in the indent 24; finally, the leg 12 is relatively pivoted until the leg 12 engages the shoulder 22 at the inner upper margin portion of the leg slot 14. In this relative position of the leg 12 and the spreader bar 16, it is noted that the leg 12 is relatively pivotable about the upper margin of the indent 24 because the height or vertical distance between the upper margin of the indent 24 and the upper edge of the extremity 20 is less than the length of the slot 14.

Of course, any pivotal movement of the legs 12 with respect to the spreader bar 16 is undesirable during normal use of stand 10, and the brace 18 is provided to urge and bias the legs 12 into wedging engagement with the shoulders 22. Preferably, the legs 12 are urged together against the shoulders 22 sufficiently to slightly bend the somewhat resilient wood of the legs 12 so that "play" or relative movement between the components of the support stand 10 is substantially eliminated.

The brace 18 maintains the legs 12 in planes angularly disposed with respect to the longitudinal axis of the spreader bar 16 in tilted positions by the interfitting or interengagement of mating slots 30 in the legs 12 and slots 32 in the brace 18.

The slots 30 in the legs 12 are substantially vertically disposed, and open upwardly to co-operate with the slots 32, which open downwardly and are arranged at an angle slightly closer to a vertical axis as compared with the angle of the plane within which the associated leg 12 would lie upon initial engagement with the associated shoulder 22 of the spreader bar 16. That is, the legs 12 are biased or slightly bent inwardly toward each other beyond their engagement with shoulders 22. As will be apparent, the inner ends of the slots 30 and 32 engage, and their margins engage adjacent portions of the brace 18 and the legs 12 to constrain the legs 12 and the brace 18 against any movement other than movement substantially along the axes of the slots 30 and 32.

Of course, since the spaced slots 30 and 32 are not vertical but are angled toward each other, a certain amount of clearance must be provided between the side margins of the slots and the legs 12 and brace 18 to permit the brace 18 to be vertically separated from the legs 12. The proper amount of such clearances to permit the legs 12 and the brace 18 to be interengaged, and yet not be objectionably relatively movable, will be readily achieved by those skilled in the art.

Thus, it will be apparent that I have provided a knock-down support stand 10 which is relatively inexpensive to manufacture, is quickly assembled, and adapted to be knocked down or taken apart for transportation or storage in compact form. No fasteners are employed to secure the component parts together, and the mutual interwedging of the components provides a firm and steady support.

Although I have shown my invention in a particular embodiment, it is obvious that changes can be made in specific details of the construction of the support stand without departing from the spirit of the claim appended hereto.

I claim:

In a knock-down support stand, the combination of: a pair of spaced apart, inwardly tilted legs, each including an opening therethrough; an elongated spreader bar arranged between said legs and having downwardly opening slots in its extremities, said extremities being removably receivable within said openings with the slots in said spreader bar cooperative with the lower margins of said openings to thereby prevent said spreader bar from being disengaged from said legs, each of said extremities further including a shoulder in its upper edge disposed inwardly of the outwardly disposed margin of the associated one of said slots in said spreader bar whereby said shoulders and said outwardly disposed margins of said slots fall within inclined planes substantially parallel to said inwardly tilted legs; and a demountable brace extending between said legs and having downwardly opening, downwardly diverging slots in its extremities, said legs having corresponding upwardly opening slots cooperative with the slots in said brace for interengagement of the margins of the respective slots, the distance between the slots in said brace being slightly less than the normal distance between the upper extremities of said legs prior to mounting of said brace thereon whereby interengagement between said legs and said brace inwardly bends and biases the upper extremities of said legs toward each other and effects forcible engagement between the outwardly disposed margins of said slots in said spreader bar and the lower margins of said openings, and between said shoulders on said spreader bar and the upper margins of said openings, said bias and the degree of forcible engagement between said legs and said spreader bar increasing as weight is applied downwardly upon said brace whereby the support stand is rendered stable during use thereof.

References Cited in the file of this patent

UNITED STATES PATENTS

| | | |
|---|---|---|
| 1,923,881 | Palais | Aug. 22, 1933 |
| 2,486,987 | Scarlett | Nov. 1, 1949 |
| 2,911,265 | Hannah | Nov. 3, 1959 |